United States Patent [19]
Mogi et al.

[11] Patent Number: 5,159,707
[45] Date of Patent: Oct. 27, 1992

[54] DIVERSITY RECEIVER

[75] Inventors: Kazuhiko Mogi; Yoshiharu Ueki; Shinobu Kawarada; Tadashi Kosuga; Koichi Kasa, all of Saitama, Japan

[73] Assignee: Pioneer Electronic Corporation, Tokyo, Japan

[21] Appl. No.: 682,763

[22] Filed: Apr. 9, 1991

[30] Foreign Application Priority Data

Apr. 12, 1990 [JP] Japan .................. 2-95184

[51] Int. Cl.$^5$ .................. H04B 17/02; H04B 7/00
[52] U.S. Cl. .................. 455/134; 455/275; 455/277.2
[58] Field of Search .............. 455/134, 133, 132, 135, 455/137, 140, 273, 275, 277

[56] References Cited

FOREIGN PATENT DOCUMENTS

0350007 1/1990 European Pat. Off. .
0158541 12/1981 Japan .................. 455/277

Primary Examiner—Reinhard J. Eisenzopf
Assistant Examiner—Christine Belzer
Attorney, Agent, or Firm—Sughrue, Mion, Zinn, Macpeak & Seas

[57] ABSTRACT

A diversity receiver has distributors each of which is connected with each of a plurality of antennas, and as many antenna switches as there are receivers. Each of the antenna switches has as many contacts as there are distributors. The distributor distributes a radio frequency signal from the antenna into as many signal paths as there are receivers. Each of the antenna switches is connected with each of the distributors via the contact connected with the signal path. A demodulated signal selecting circuit has as many contacts as there are said receivers. The demodulated signal selecting circuit receives the demodulated output of the receivers via each of said second contacts to selectively output the demodulated outputs of the receivers.

10 Claims, 8 Drawing Sheets

DIVERSITY RECEIVER

BACKGROUND OF THE INVENTION

1. Field of the Invention

The present invention relates to a diversity receiver provided with at least two receivers.

2. Prior Art

There have been the diversity receiving system in which a receiver is fed the strongest signal of radio frequency signals supplied from a plurality of antennas so that the receiver can always deliver an audio output of a good quality. Meanwhile, a function has been proposed where the diversity receiver has two receivers so that various controls over the receivers can be performed with the audio output uninterrupted. One such function is the BSM (Best Stations Memory) where broadcasting stations are searched across the receiving frequency band of the radio receiver for signal strengths above a predetermined value so that several frequencies are stored into a memory in the order of signal strength and they are recalled later by means of a preset button. Another function is the Network-Follow, one of the services in the RDS broadcast which has been put in practical use in Europe. The RDS data of the station currently being received has the AF data, which are the frequency data of the other stations that are broadcasting the same program as the currently tuned station. The AF data is decoded and is stored into the memory residing within the receiver. The stored AF data is read out to receive an alternative station in the same network when the signal strength of the currently tuned station decreases below a predetermined level.

Figure 3:
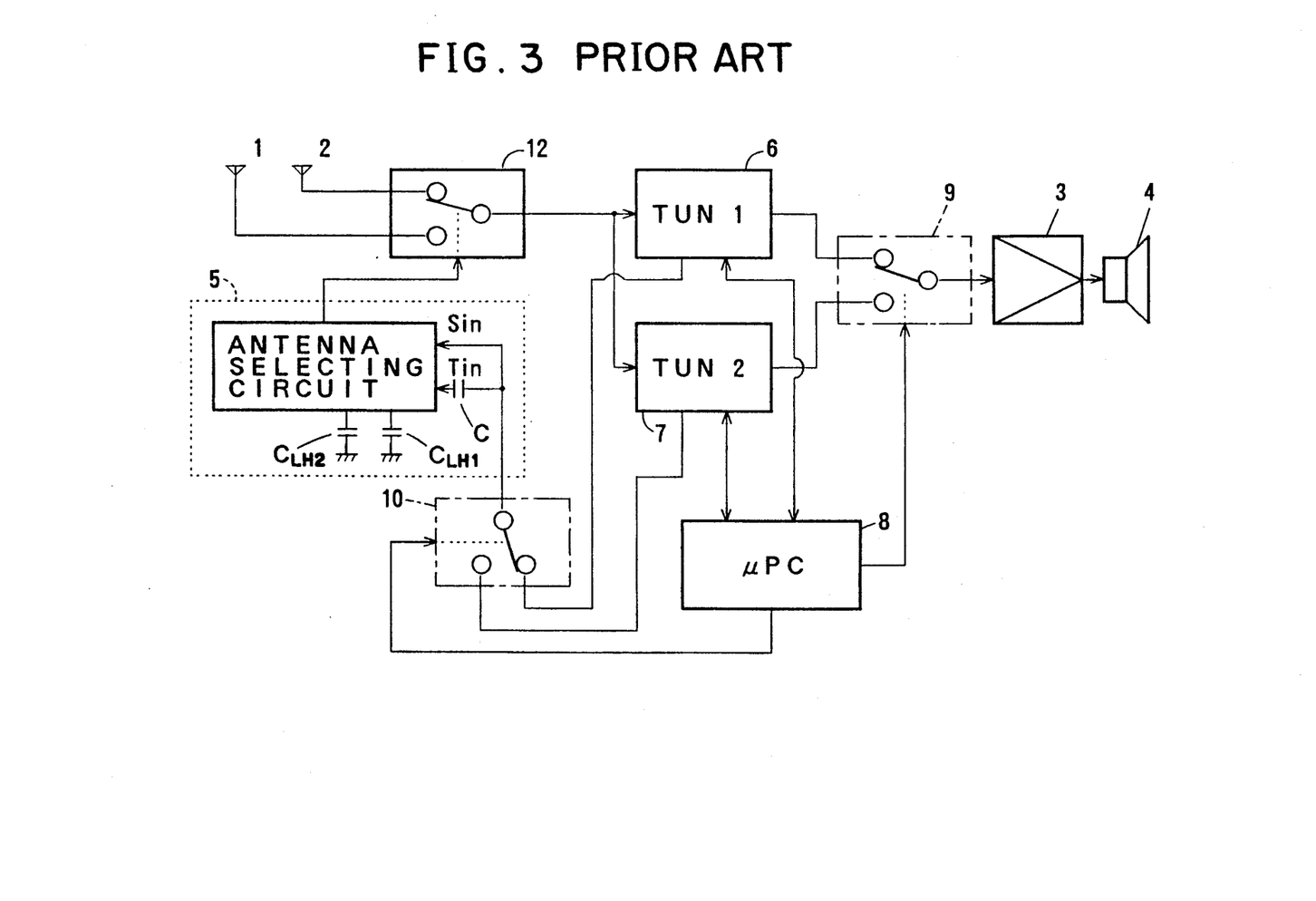
FIG. 3 is a block diagram showing a prior art diversity receiver.

FIG. 3 shows a prior art diversity receiver provided with two receivers for effective use of the aforementioned functions. The receivers 6 and 7 are adapted to receive different frequencies. A microprocessor 8 supplies a command signal to both a first and second receivers 6 and 7 when the BSM function or the RDS network-follow function is required. An antenna 1 and an antenna 2 are mounted at different locations on a vehicle, and feed a radio frequency signal to an antenna switch circuit 12 which in turn selectively supplies the radio frequency signal to the respective receivers 6 and 7 under control of an antenna switch controller 5.

Figure 4A:
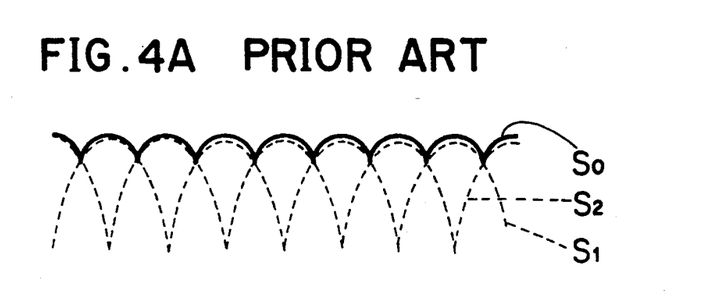
FIGS. 4A-4C illustrate the signal waveforms of antenna outputs and antenna switch controlling signals used for explaining the prior art diversity receiver.

FIG. 4A illustrates the changes with time of the radio signals supplied to the on-vehicle receiver 6 running in a street. A signal S1 is outputted from the antenna 1 such as a rod antenna positioned at the front of the vehicle and a signal S2 from the antenna 2 such as an indoor antenna mounted on the rear window of the vehicle. While the vehicle is running, the output of the respective antennas exhibit substantially periodic changes in magnitude as shown in FIG. 4A due largely to multipath effect of the radio frequency signal. These signals differ from each other in time position of their peaks and valleys due to their different locations on the vehicle. The distances between peaks or between valleys account for the frequency of the signal.

Assuming that the signal from the antenna 1 has been selected by the antenna switch 12, the antenna switch controller 5 receives from the receiver 6 a field intensity signal indicative of the signal strength of the output from the antenna 1; the average value of the field intensity signal at an input terminal Sin, and a time varying component, i.e. noise component of the field intensity signal at an input terminal Tin through a capacitor C. The magnitude of the time varying component increases with decreasing signal strength from the antenna 1, i.e., the radio frequency signal becomes weak and noisy. When the time varying component exceeds a predetermined value, the antenna switch controller 5 holds across a hold capacitor CLH-1 the average value of the field strength signal supplied to the Sin. Then, the antenna switch controller 5 drives the antenna switch 12 to direct the radio frequency signal to the receiver 6 so as to receiver a field intensity signal indicative of the signal strength of the output from the antenna 1. Again, when the time varying component exceeds a predetermined value, the antenna switch controller 5 holds across a hold capacitor CLH-2 the average value of the field strength signal supplied to the Sin. The controller 5 compares the voltage across the capacitor CLH-1 with that across the capacitor CLH-2 to determine a capacitor with a higher voltage. The controller 5 drives the antenna switch 12 to select an antenna that results the higher voltage across the capacitor.

For example, the antenna 1 is assumed to have been selected. When the field strength signal decreases below the voltage across the hold capacitor CLH-1, the antenna switch 12 is shifted into the position of antenna 2. Then, when the field strength signal decreases below the voltage across the hold capacitor CLH-2, the antenna switch 12 is shifted again into the position of antenna 1.

Figure 4B:
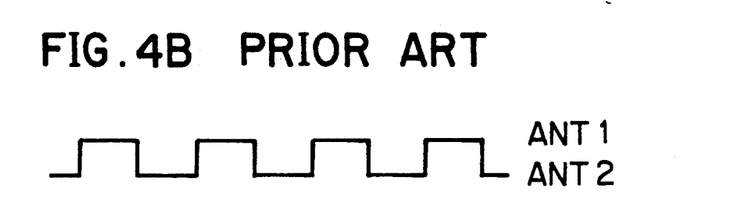

FIG. 4B illustrates an antenna selecting signal outputted from the antenna switch controller 5 and FIG. 4A shows in a solid line the time varying magnitude of the signal S0 actually supplied into the receiver 6. The operation of the antenna switch can be controlled by a variety of methods well known in the art such that the signal S0 is fed to the receiver 6.

Figure 4C:
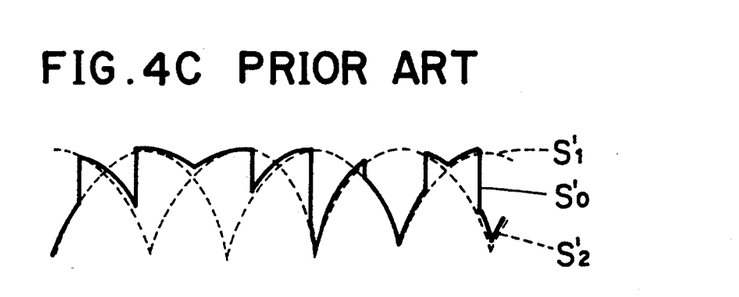
Figure 5A:
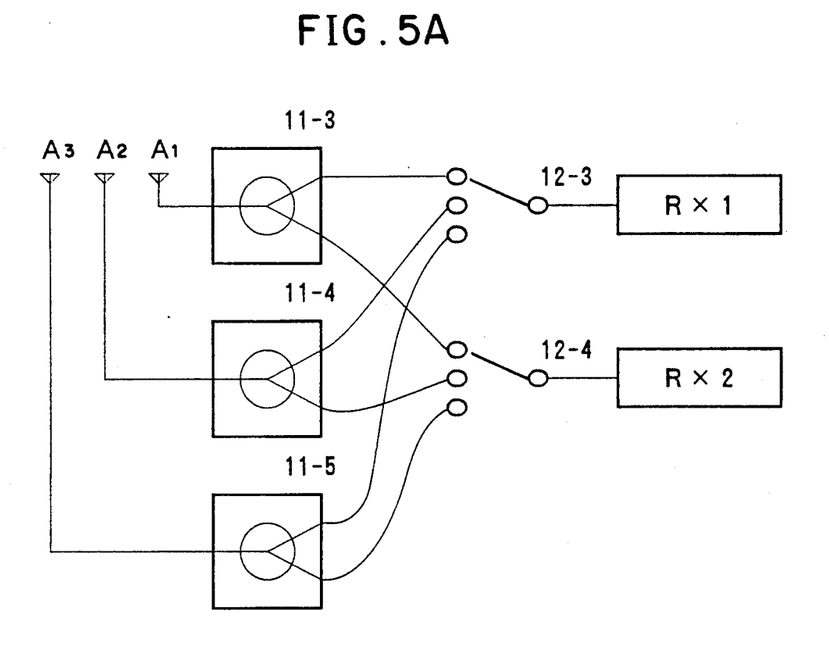
FIGS. 5A-5D show possible combinations of the number of receivers and antennas in the invention.
Figure 5B:
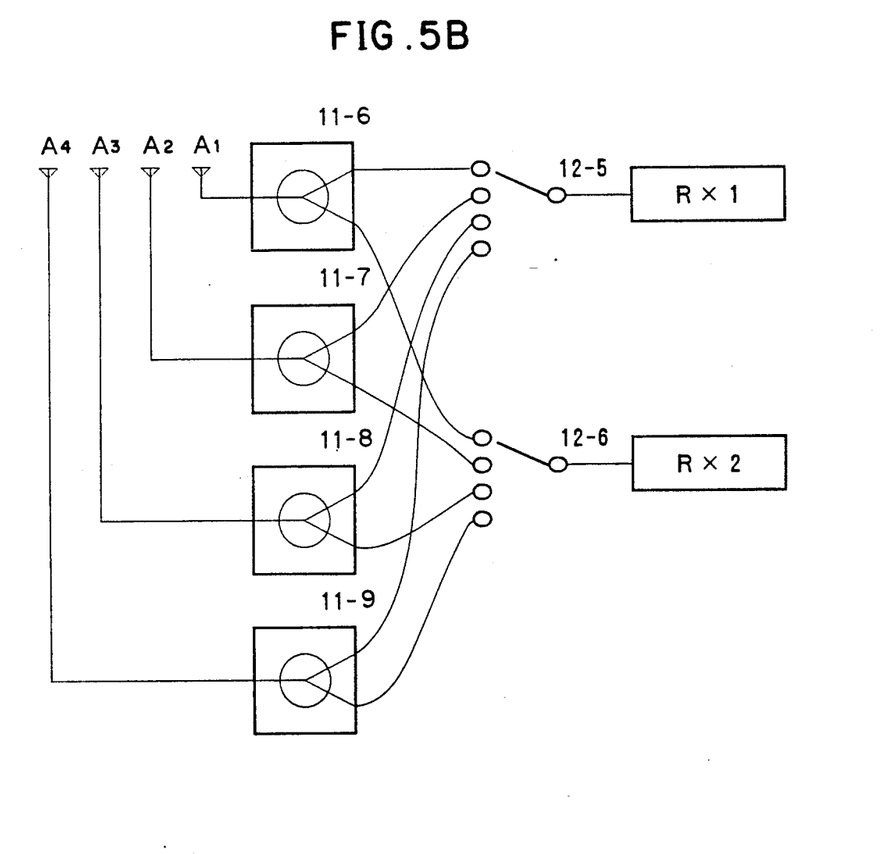
Figure 5C:
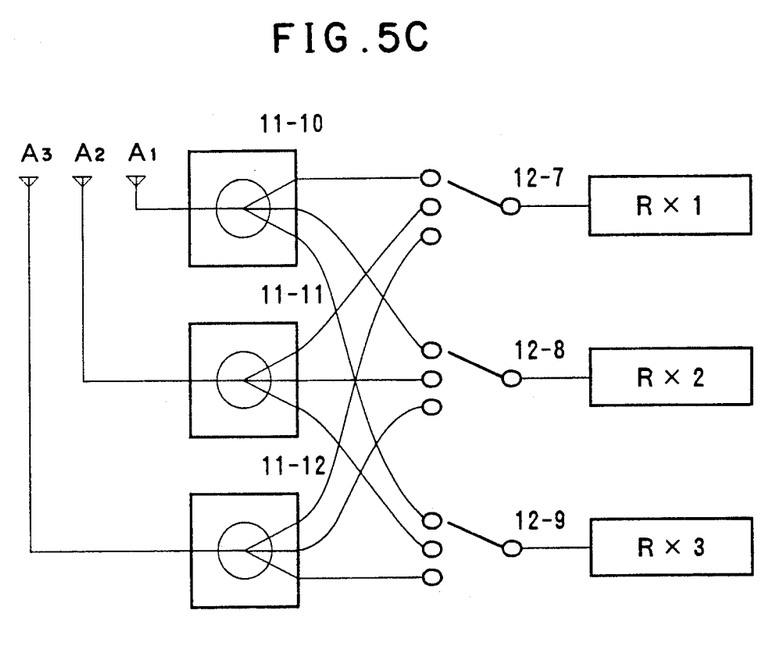
Figure 5D:
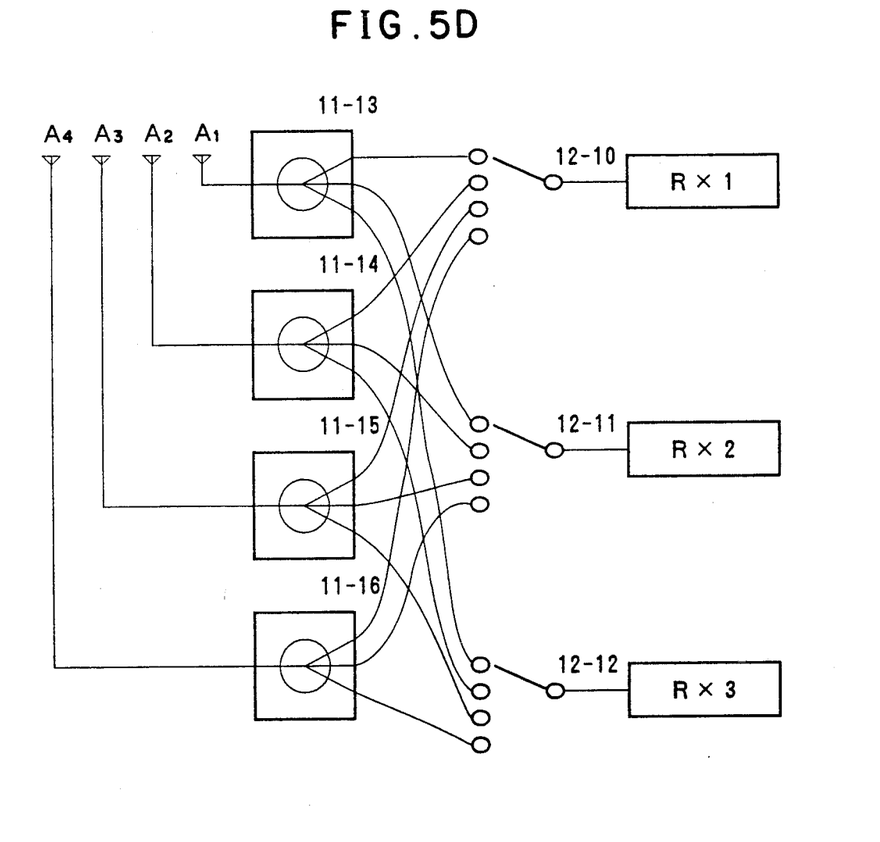

Let us consider that the network follow function is to be performed while the vehicle is running. FIG. 4C shows the change with time of field intensity signals S1' and S2' supplied to the receiver 7 while the vehicle is running. The antennas 1 and 2 are selected alternatively with a timing corresponding to the frequency being received by the receiver 6. There is no serious problem if the receivers 6 and 7 are to receive frequencies close to each other. However, the system suffers a serious problem if the two receivers are to receive frequencies relatively far from each other. FIG. 4C shows in a solid line the signal actually supplied to the receiver 7 when the receiver 7 receives a frequency quite different from that received by the receiver 6. In the figure, the input to the receiver 7 varies randomly with large changes in magnitude. This causes the demodulated output of the receiver 7 to be deteriorated seriously, failing to perform the network follow function.

SUMMARY OF THE INVENTION

An object of the invention is to provide a diversity receiver in which various functions such as BSM and RDS network-follow can be performed without interrupting or disturbing the receiver output of the station currently being received. A diversity receiver according to the present invention has distributors, each of which is connected with a plurality of receiving antennas. Each of the distributors distributes the radio frequency signal supplied from each antenna into as many signals paths as there are receivers. There are as many antenna switches as there are receivers, each switch being connected to corresponding one of receiver. Each of the antenna switches has as many contacts as there are antennas and is connected with each of the distributors via the contact connected with the signal path. Each antenna switch selects a radio frequency signal of the largest magnitude of the signals supplied from the respective distributors, and supplies it to the corresponding receiver. The outputs of the receivers are directed to a demodulated signal switching circuit which selectively outputs the outputs of the receivers.

DESCRIPTION OF THE DRAWINGS

Features and other objects of the invention will be more apparent from the description of the preferred embodiments with reference to the accompanying drawings in which.

DETAILED DESCRIPTION OF THE PREFERRED EMBODIMENTS

Figure 1:
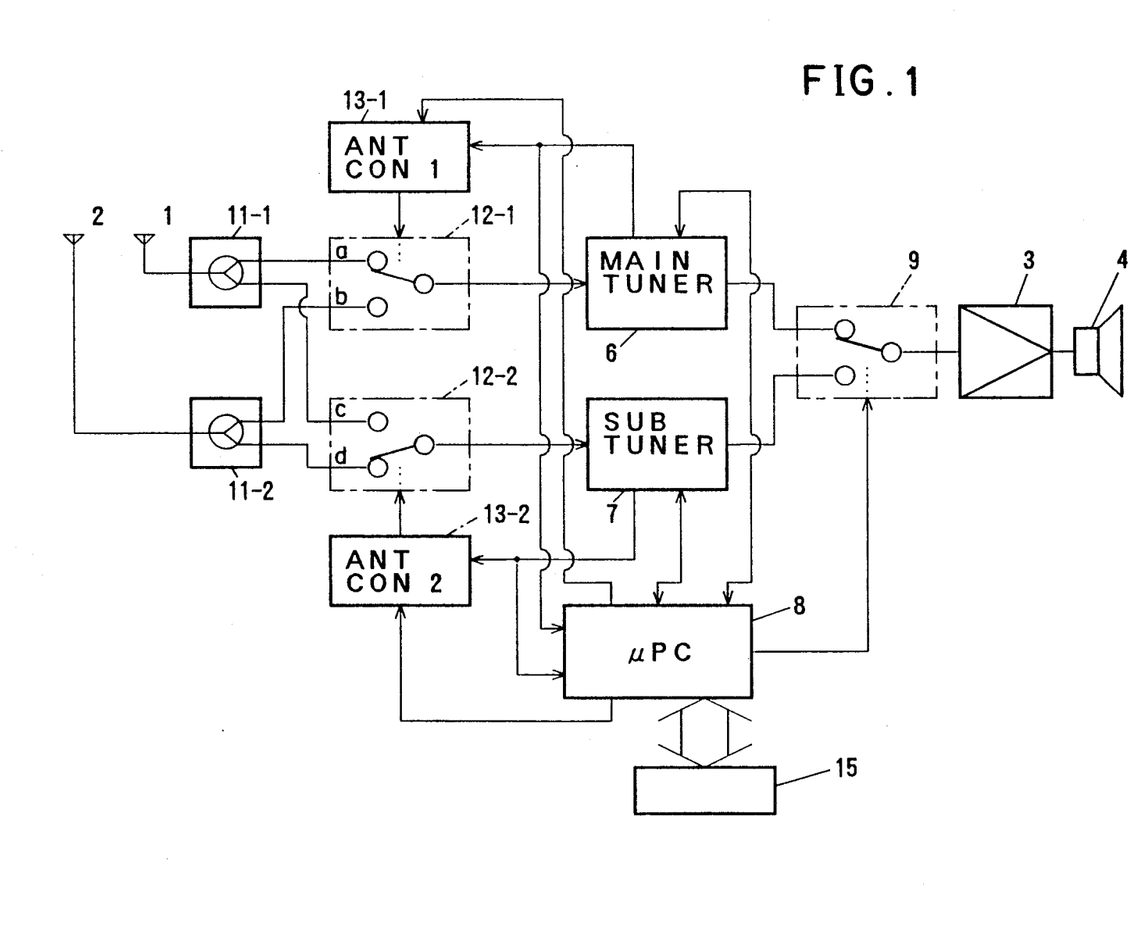
FIG. 1 is a block diagram showing an embodiment of a twin-receiver type diversity receiver according to the present invention.

FIG. 1 shows an embodiment of a twin-receiver type diversity receiver, having two receivers and two antennas, according to the present invention. The output of an antenna 1 is supplied via a distributor 11-1 to a contact a of an antenna switch 12-1 and to a contact c of an antenna switch 12-2. Likewise, the output of an antenna 2 is supplied via a distributor 11-2 to a contact b of the antenna switch 12-1 and to a contact d of the antenna switch 12-2. The output of the antenna switch 12-1 is supplied to a main receiver 6 which demodulates the signal into an audio signal and supplies it to a demodulated signal selecting switch 9. The receiver 6 also outputs a field intensity signal to an antenna switch controller 13-1. The field intensity signal is produced based on the intermediate frequency of the receiver 6 and indicates the field intensity of the radio frequency signal supplied to the receiver 6. The antenna switch controller 13-1 operates in the same way as the antenna switch controller 5 in FIG. 3 to drive the antenna switch 12-1 so as to supply the receiver 6 with a radio frequency signal either from antenna 1 or antenna 2, whichever is stronger. In this way, the receiver 6 properly operates as a diversity receiver. A microcomputer 8 drives the switch 9 to supply the output of receiver 6 to a power amplifier 3 which sends an amplified audio signal to a speaker 4. A receiver 7 operates as a sub receiver.

The microcomputer 8 receives a command from an external command device 15 and outputs to the receivers 6 and 7 a command signal for performing a function such as the BSM. Meanwhile, the microcomputer 8 outputs, for example, a BSM command signal to the receiver 7 which in turn outputs a field intensity signal to the antenna switch controller 13-2. This field intensity signal is produced based on the intermediate frequency of the receiver 7 and represents the field intensity of the radio frequency signal supplied to the receiver 7. The antenna switch controller 13-2 operates in the same way as the antenna switch controller 5 in FIG. 3 to drive the antenna switch 12-2 so as to supply the receiver 7 with a radio frequency signal either from antenna 1 or antenna 2, whichever is stronger. It should be noted that the receiver 7 is supplied with the signals from the antennas 1 and 2 independently of the operation of the antenna switch 12-1. The microcomputer 8 receives the field intensity signals from the receivers 6 and 7, respectively, and compares one field intensity signal with the other to output a signal to the switch 9 so that the switch 9 selects an audio signal from either the receiver 6 or receiver 7, whichever receives a stronger radio signal. In this manner, the receivers 6 and 7 can receive stations of different frequencies independently of the other. This operation allows the RDS network-follow function where an alternative station of the same network is sought, and the BSM function where the sytem searches for a station that provides best possible receiving condition without interrupting the receiver output of the station currently being received.

Figure 2A:
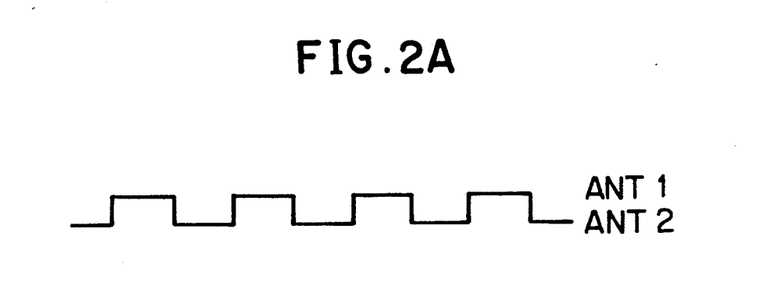
FIGS. 2A-2D illustrate the signal waveforms of antenna outputs and antenna switch controlling signals used for explaining the present invention.
Figure 2B:
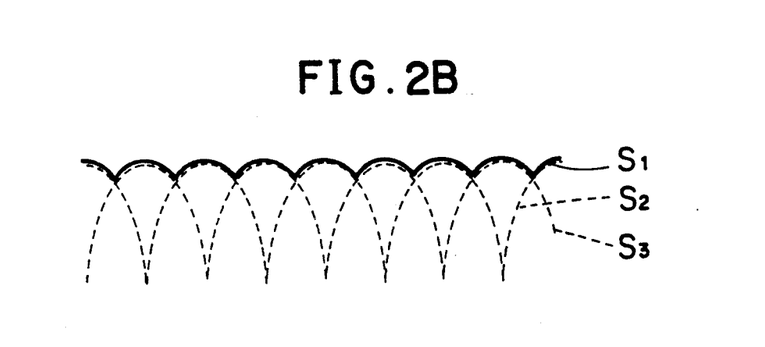
Figure 2C:
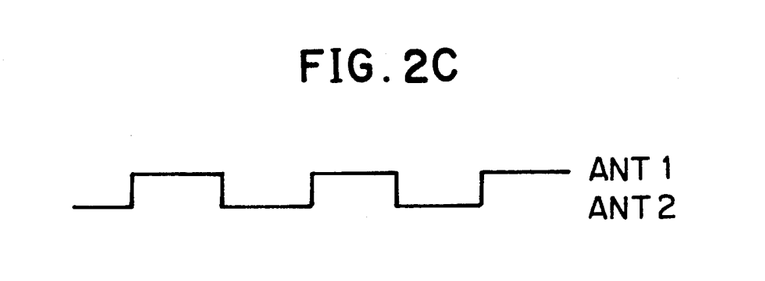
Figure 2D:
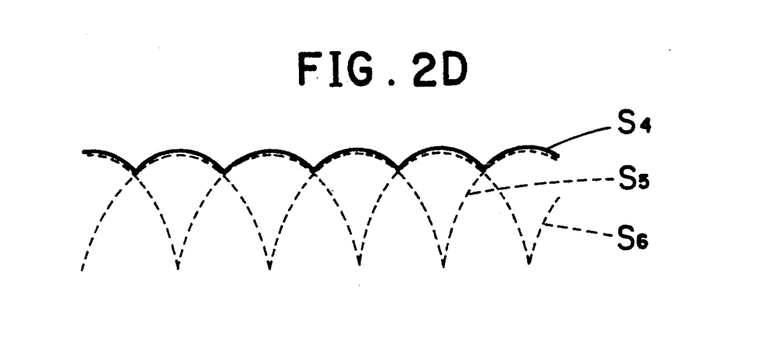

FIG. 2B shows a time varying field intensity of a radio frequency signal being received by the receiver 6 while the vehicle is running in a street. A signal S2 is the output of the antenna 2, and the signal S3 the output of the antenna 1. A signal S1, shown in a solid line, is the signal actually supplied to the receiver 6. FIG. 2A shows an antenna selecting signal outputted from the antenna switch controller 13-1 so as to drive the antenna switch 12-1. FIG. 2D shows a time varying field intensity being received by the receiver 7 while the vehicle is running. In the figure, a signal S5 is the output of the antenna 1 and a signal S6 the output of the antenna 2. A signal S4, shown in a solid line, is the signal actually supplied to the receiver 7. FIG. 2A shows an antenna selecting signal outputted from the antenna switch controller 13-2 so as to drive the antenna switch 12-2. Since the receivers 6 and 7 receive different frequencies, the antenna selecting signal in FIG. 2C has a period different from that shown in FIG. 2A. It should be noted that the frequency being received by the receiver 6 determines the period of the signal in FIG. 2A while the frequency being received by the receiver 7 determines that in FIG. 2C.

The output of the respective antenna varies depending on areas within the town where the vehicle is running, and therefore the voltages across the holding capacitors should be updated from time to time. On such an occasion, the microcomputer 8 outputs a command to the receiver 7 in response to a signal supplied from the external command device 15, so that the receiver 7 receives the same station as the receiver 6 is currently receiving. Then, the microcomputer 8 drives the switch 9 to direct the output of the receiver 7 to the power amplifier 3, thus the receiver 7 operates as a temporary "main" receiver. While the receiver 7 is operating as a main receiver, the microcomputer 8 outputs a command signal to the antenna switch controller 13-1 which in turn updates the voltages across the capacitors CLH1 and CLH2 in accordance with the field intensity signals supplied from the receiver 6 in the same way as mentioned with reference to FIG. 3. Then, the microcomputer 8 again drives the switch 9 to direct the output of the receiver 6 to the power amplifier 3, thus the receiver 6 again operates as a main receiver. In this manner, the holding voltages held across the capacitors CLH can be updated from time to time without interrupting the receiver output. This updating operation of antenna switch controller makes the diversity receiver more useful.

Antennas and receivers can be combined in a variety of numbers as shown FIGS. 5A-5D, in which cases there will be as many of the holding capacitors CLH as there are antennas.

What is claimed is:

1. A diversity receiver comprising:
   a plurality of receivers, each of which receives a radio frequency signal and outputs a demodulated output;
   a plurality of distributors, each of which is connected to a corresponding one of a plurality antennas and distributes a radio frequency signal from said corresponding antenna into as many signal paths as there are said receivers;
   a plurality of antenna switches, each of which has as many first contacts as there are said distributors, each of said antenna switches being connected with each of said distributors via said first contact connected with said signal paths, each of said antenna switches receiving the radio frequency signal from each of said distributors and selectively outputting the radio frequency signals received via said first contacts to a corresponding one of said receivers; and
   a demodulated signal selecting circuit having as many second contacts as there are said receivers, said demodulated signal selecting circuit receiving said demodulated output from each of said receivers via each of said second contacts and selectively outputting said demodulated outputs.

2. A diversity receiver according to claim 1, wherein said plurality of receivers consist of a first receiver for receiving a first frequency and a second receiver for receiving a second frequency.

3. A diversity receiver according to claim 1, said diversity receiver further includes a plurality of antenna switch controllers, each of which receives a field intensity signal from a corresponding one of the receivers, said field intensity signal indicating a strength of a radio frequency signal currently being received by said receiver, and each of said antenna switch controllers controlling a corresponding one of said antenna switches to select one of said first contacts in accordance with a magnitude of said field intensity signal.

4. A diversity receiver according to claim 3, wherein said antenna switch controller holds a reference signal having a value predetermined on the basis of the outputs of said plurality of antennas, said antenna switch controller controls said antenna switch to select a new contact when said field intensity signal decreases below said predetermined value, said new contact delivering a radio frequency signal of the largest magnitude of radio frequency signals currently supplied to said antenna switch from said distributors.

5. A diversity receiver according to claim 4, wherein said diversity receiver further includes a second controller for controlling said receivers, antenna switches, demodulated signal selecting circuit, and antenna switch controllers, said second controller responsive to an external command to control at least one of said antenna switch controllers so as to update said predetermined value held in said antenna switch controller.

6. A diversity receiver comprising:
   a plurality of antennas;
   a plurality of receivers receiving a radio frequency signal and generating a demodulated output signal;
   a plurality of distributors, each of which is connected to corresponding one said antennas to permit said distributors to distribute a radio frequency signal from said corresponding one of said antennas into as many signal paths as there are said receivers;
   a plurality of antenna switches each including a first contact corresponding to each of said distributors, each of said antenna switches being connected with each of said distributors via said first contact connected with said signal paths, each of said antenna switches receiving the radio frequency signals from each of said distributors and selectively providing the radio frequency signals received via said first contacts to a corresponding one of said receivers; and
   a demodulated signal selecting circuit having as many second contacts as there are said receivers, said demodulated signal selecting circuit receiving said demodulated output from each of said receivers via each of said second contacts and selectively outputting said demodulated outputs; wherein
   each of said antenna switches is operably coupled to a corresponding one of said receivers so as to permit each of said antenna switches to be controlled in response to a signal generated by said corresponding receiver.

7. A diversity receiver according to claim 6, wherein said receivers comprise a first receiver for receiving a first radio signal at a first frequency and a second receiver for receiving a second radio signal at a second frequency different from said first frequency.

8. A diversity receiver according to claim 6, wherein said diversity receiver further comprises a plurality of antenna switch controllers, each of which is operatively coupled to a corresponding one of said receivers and each of which receives a field intensity signal, indicating a strength of a radio frequency signal currently being received by said corresponding receiver, whereby each of said antenna switch controllers selects one of said first contacts beasd on a magnitude of said field intensity signal from said corresponding receiver.

9. A diversity receiver according to claim 8, wherein said antenna switch controller holds a reference signal having a value predetermined on the basis of the outputs of said plurality of antennas, and wherein said antenna switch controller controls said antenna switch to select a new contact when said field intensity signal decreases below said predetermined value, said new contact delivering a radio frequency signal of the largest magnitude of radio frequency signals currently supplied to said antenna switch from said distributors.

10. A diversity receiver according to claim 9, wherein said diversity receiver further comprises a second controller for controlling said receivers, antenna switches, demodulated signal selecting circuit, and antenna switch controllers, said second controller responsive to an external command to control at least one of said antenna switch controllers so as to update said predetermined value held in said antenna switch controller.

* * * * *